United States Patent [19]
Kudo et al.

[11] Patent Number: 5,576,913
[45] Date of Patent: Nov. 19, 1996

[54] MAGNETIC HEAD FOR HARD DISK HAVING READING CORE AND TRAILING CORE

[75] Inventors: Noriaki Kudo; Hiroshi Sampei; Masashi Sato, all of Yamagata, Japan

[73] Assignee: Mitsumi Electric Co., Ltd., Tokyo, Japan

[21] Appl. No.: 361,562

[22] Filed: Dec. 22, 1994

[30] Foreign Application Priority Data

Dec. 29, 1993 [JP] Japan ................. 5-076018 U

[51] Int. Cl.$^6$ ................................................. G11B 5/60
[52] U.S. Cl. ........................................................ 360/103
[58] Field of Search ............................................ 360/103

[56] References Cited

U.S. PATENT DOCUMENTS 5,136,444  8/1992  Maki ................................. 360/103

Primary Examiner—A. J. Heinz
Attorney, Agent, or Firm—Whitham, Curtis, Whitham & McGinn

[57] ABSTRACT

In a magnetic head having composed of a reading core and a trailing core, not only an air bearing surface of the reading core is formed so as to be a single air bearing surface, but also the operation of forming a track width and chamfering portions is performed on a common surface with the reading core and the trailing core bonded to each other.

5 Claims, 2 Drawing Sheets

MAGNETIC HEAD FOR HARD DISK HAVING READING CORE AND TRAILING CORE

BACKGROUND OF THE INVENTION

1. Field of the Invention

The device relates to a hard disk serving as a magnetic storage device for a personal computer, a word processor, and the like, and more particularly to a monolithic magnetic head for such a hard disk.

2. Related Art

A magnetic head for a hard disk serving as a magnetic storage device used for electronic equipment of these types generally comes in various structures and shapes according to the purpose and function. For example, a magnetic head 1 shown in perspective form in FIG. 3 is of a monolithic type used for a hard disk.

As shown in FIG. 3, the conventional monolithic magnetic head 1 includes a reading core 2 serving as a slider and a trailing core 3. Both the reading core 2 and the trailing core 3 are made of a magnetic substance such as ferrite. A magnetic gap 4 is formed between surfaces for bonding the reading core 2 and the trailing core 3, so that a magnetic path is formed.

Further, the reading core 2 has groove portions 5, 6 on air bearing surfaces 2a that form air bearings so as to confront a magnetic disk that serves as a recording medium. The groove portions 5, 6 are designed to regulate not only the track width of the magnetic gap 4 arranged on the trailing core 3 but also the floating amount of the magnetic head 1 by adjusting the air bearing effects of the air bearing surfaces 2a.

As a result of forming these groove portions 5, 6, a track width forming projection 7 is formed in the middle of the magnetic head 1.

This magnetic head 1 also has chamfered portions 8 on outer peripheral edge portions 2b, 2c, 2d, 2e of the air bearing surfaces 2a of the reading core 2, the groove portions 5, 6, and the track width forming projection 7.

To implement this design, a method of forming the conventional magnetic head 1 involves the steps of: bonding a reading core 2 block and a trailing core 3 block to form a magnetic path; forming a yoke portion of the trailing core 3 for winding; forming the groove portions in the reading core 2; finishing the air bearing surfaces 2a; forming the track width by a cup wheel grindstone and chamfering the air bearing surfaces 2a; and finally cutting the magnetic head out of the magnetic head block.

However, the thus designed conventional magnetic head 1 for a hard disk involves not only the step of forming the groove portions 5, 6 but also the step of chamfering a number of portions in the process of machining the respective core portions of the magnetic head 1.

This has imposed a problem that the magnetic head 1 cannot be downsized and that the cost of manufacture thereof cannot be reduced because of a number of steps involved in forming the magnetic head 1.

SUMMARY OF THE INVENTION

The device has been made in consideration of the aforementioned problem addressed by the conventionally designed magnetic head for a hard disk. Accordingly, the object of the device is to provide a smaller and inexpensive magnetic head.

To achieve the above object, the device is applied to a magnetic head for a hard disk in a monolithic magnetic head for a hard disk comprising a reading core and a trailing core and having the reading core and the trailing core formed of pieces of a ferritic material. Such magnetic head is characterized as being formed of a reading core and a trailing core, the reading core having a single air bearing surface being formed of long side chamfered portions and short side chamfered portions, the trailing core having a track width formed on a track forming chamfered portion.

According to the aforementioned design, the groove forming and chamfering steps can be eliminated in the method of forming the magnetic head of the device.

DETAILED DESCRIPTION OF THE PREFERRED EMBODIMENTS

Embodiments of the device will now be described with reference to the drawings.

Figure 1:
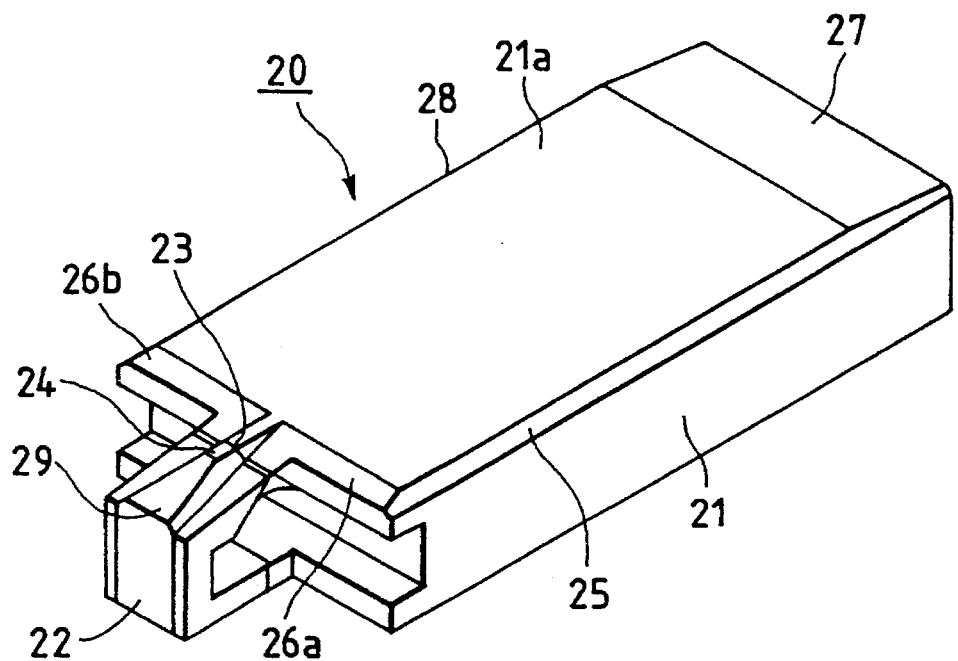
FIG. 1 is a perspective view showing a monolithic magnetic head, which is an embodiment of the device.
Figure 2:
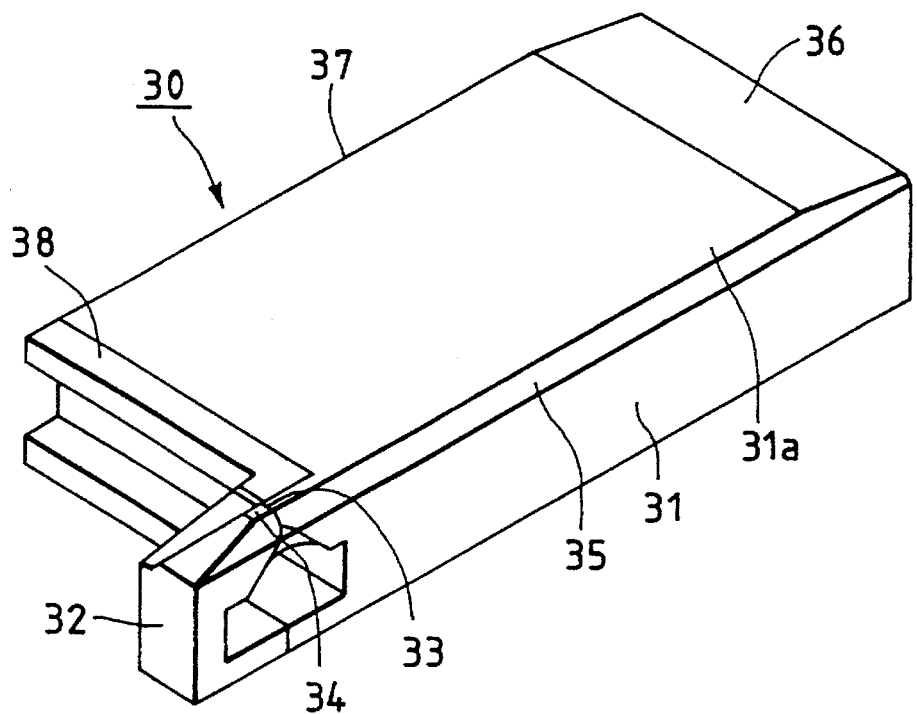
FIG. 2 is a perspective view showing a monolithic which is another embodiment of the device.
Figure 3:
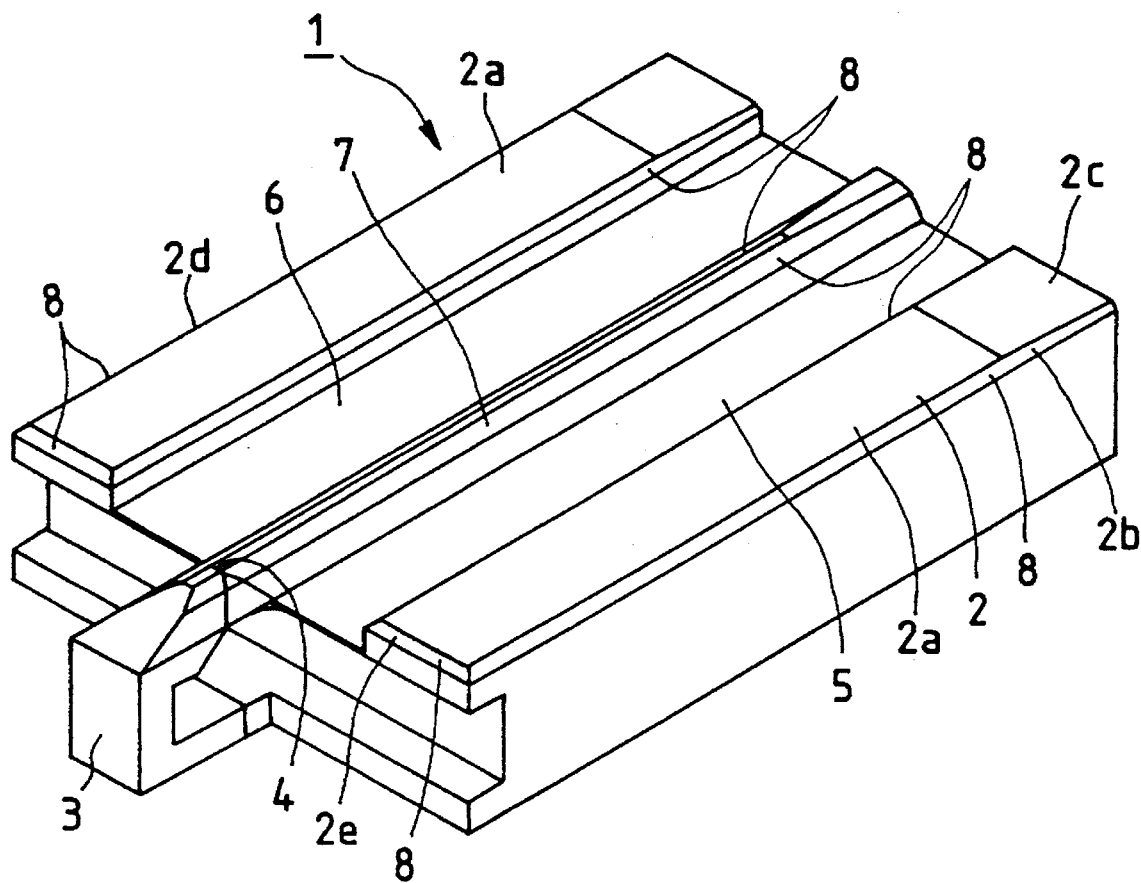
FIG. 3 is a perspective view showing a conventional monolithic magnetic head.

FIG. 1 is a perspective view showing a monolithic magnetic head, which is an embodiment of the device; and FIG. 2 is a perspective view showing a monolithic magnetic head, which is another embodiment of the device.

As shown in FIG. 1, a monolithic magnetic head 20 of the device includes: a reading core 21 formed of a single air bearing surface 21a serving as a slider; and a trailing core 22 arranged in the middle of the reading core 21. Both the reading core 21 and the trailing core 22 are made of a magnetic substance such as ferrite. A magnetic gap 23 regulated by a track width 24 is formed between surfaces for bonding the reading core 21 and the trailing core 22.

Further, the magnetic head 20 has chamfered portions 25, 26a, 26b, 27, 28 in the periphery of the reading core 21 to form the bearing surface 21a.

Furthermore, the trailing core 22 has a chamfered portion 29 on a surface on which the magnetic gap 23 regulated by the track width 24 is formed. The track width 24 is formed at the same time the chamfered portions 26a, 26b of the reading core 21 are formed. As shown in FIG. 1, the track width 24 is defined by the chamfered side surface 29 formed on the trailing core 22, and the chamfered side surface 29 is arranged on an extension line defined by extending chamfered side surface 26a (or 26b).

That is, a method of forming the magnetic head 20 of the device involves the steps of: forming a magnetic head block with a gap by bonding a reading core 21 block to a trailing core 22 block; forming the trailing core 22 serving as a yoke out of the trailing core block; finishing the air bearing surface of the reading core block; forming the track width of the trailing core 22 and forming the chamfered portions; and cutting the magnetic head 20 out of the magnetic head block.

Here, the step of forming both the track width 24 of the trailing core 22 and the chamfered portions is performed by a single grinding operation because the operation of forming the track width 24 of the trailing core 22 and the chamfered portions is performed in the same directions that extend in parallel with respect to the central axis in the longitudinal direction of the magnetic head 20.

Another embodiment of the device will be described next with reference to the perspective view of FIG. 2. As shown in FIG. 2, a magnetic head 30, which is another embodiment of the device, includes: a reading core 31 formed of a single bearing surface 31a serving as a slider; and a trailing core 32 arranged on a single lateral side of the reading core 31, both cores 31, 32 forming a magnetic gap 33.

Here, a track width 34 of the trailing core 32 is formed at the time of grinding chamfered portions 35 and 38 in the step of forming chamfered portions 35, 36, 37, 38. That is, a method of forming the magnetic head 30 is characterized as skipping the cutting step by making the chamfered portion of the reading core 31 common with the chamfered portion of the trailing core 32.

As described in the foregoing, the magnetic head of the device is characterized as forming the reading core of a single air bearing surface serving as a slider and allowing the forming of the track width of the trailing core and the chamfering of the reading core to be performed on a common surface. Therefore, not only the step of forming the grooves on the air bearing surface as in the conventional example can be dispensed with, but also the number of chamfering operations can be reduced, thereby allowing a smaller, inexpensive magnetic head to be provided.

What is claimed is:

1. A magnetic head for a hard disk magnetic storage device, comprising:

a reading core;

a single air bearing surface formed on a side of said reading core, said single air bearing surface having a smooth upper surface and a first chamfered side surface;

a trailing core connected to said reading core; and a magnetic gap regulated by a track width and being formed between said reading core and said trailing core;

said track width being defined by a second chamfered side surface formed on said trailing core, and said second chamfered side surface being arranged on an extension line defined by extending said first chamfered side surface.

2. A magnetic head according to claim 1, wherein said trailing core is bonded to said reading core.

3. A magnetic head according to claim 1, wherein said reading core and said trailing core comprise a ferritic material.

4. A magnetic head according to claim 1, wherein said trailing core comprises a magnetic yoke.

5. A magnetic head according to claim 1, wherein said reading core has a rectangular shape.

* * * * *